United States Patent
Stolarczyk

(10) Patent No.: US 6,927,698 B2
(45) Date of Patent: Aug. 9, 2005

(54) SHUTTLE-IN RECEIVER FOR RADIO-IMAGING UNDERGROUND GEOLOGIC STRUCTURES

(76) Inventor: Larry G. Stolarczyk, 848 Clayton Hwy., Raton, NM (US) 87740

( * ) Notice: Subject to any disclaimer, the term of this patent is extended or adjusted under 35 U.S.C. 154(b) by 604 days.

(21) Appl. No.: 10/161,378

(22) Filed: Jun. 4, 2002

(65) Prior Publication Data

US 2003/0063014 A1 Apr. 3, 2003

Related U.S. Application Data

(60) Provisional application No. 60/335,520, filed on Oct. 31, 2001, and provisional application No. 60/315,149, filed on Aug. 27, 2001.

(51) Int. Cl.$^7$ ................................................ G01V 3/00
(52) U.S. Cl. ................ 340/853.8; 324/323; 324/329; 324/338; 166/250.01
(58) Field of Search ................ 340/853.8; 166/250.01; 324/323, 326, 329, 338

(56) References Cited

U.S. PATENT DOCUMENTS

| | | | |
|---|---|---|---|
| 4,577,153 A | 3/1986 | Stolarczyk | |
| 4,691,166 A | 9/1987 | Stolarczyk | |
| RE32,563 E | 12/1987 | Stolarczyk | |
| 4,742,305 A | 5/1988 | Stolarczyk | |
| 4,753,484 A | 6/1988 | Stolarczyk et al. | |
| 4,777,652 A | 10/1988 | Stolarczyk | |
| 4,879,755 A | 11/1989 | Stolarczyk et al. | |
| RE33,458 E | 11/1990 | Stolarczyk | |
| 4,968,978 A | 11/1990 | Stolarczyk | |
| 4,994,747 A | 2/1991 | Stolarczyk | |
| 5,066,917 A | 11/1991 | Stolarczyk | |
| 5,072,172 A | 12/1991 | Stolarczyk et al. | |
| 5,087,099 A | 2/1992 | Stolarczyk | |
| 5,093,929 A | 3/1992 | Stolarczyk et al. | |
| 5,121,971 A | 6/1992 | Stolarczyk | |
| 5,146,611 A | 9/1992 | Stolarczyk | |
| 5,181,934 A | 1/1993 | Stolarczyk | |
| 5,188,426 A | 2/1993 | Stolarczyk et al. | |
| 5,260,660 A | 11/1993 | Stolarczyk | |
| 5,268,683 A | 12/1993 | Stolarczyk | |
| 5,301,082 A | 4/1994 | Stolarczyk et al. | |
| 5,408,182 A | 4/1995 | Stolarczyk et al. | |
| 5,474,261 A | 12/1995 | Stolarczyk et al. | |
| 5,686,841 A | 11/1997 | Stolarczyk et al. | |
| 5,769,503 A | 6/1998 | Stolarczyk et al. | |

*Primary Examiner*—Timothy Edwards, Jr.
(74) *Attorney, Agent, or Firm*—Richard B. Main

(57) ABSTRACT

A coal bed anomaly detection and imaging system comprises a synchronous transmitter and receiver that are separated by a geologic structure with embedded and hidden anomalies. The receiver is housed in a shuttle body that can be pumped into a borehole by water or air pressure. The shuttle may itself employ hydraulic inching mechanism to move within the drillhole. Signal measurements are reported out over a fiberoptic pigtail. A separate radio signal path provides synchronization between the transmitter and receiver. The receiver shuttle is tethered by this fiberoptic pigtail, and it can be withdrawn from the borehole by the tether.

11 Claims, 6 Drawing Sheets

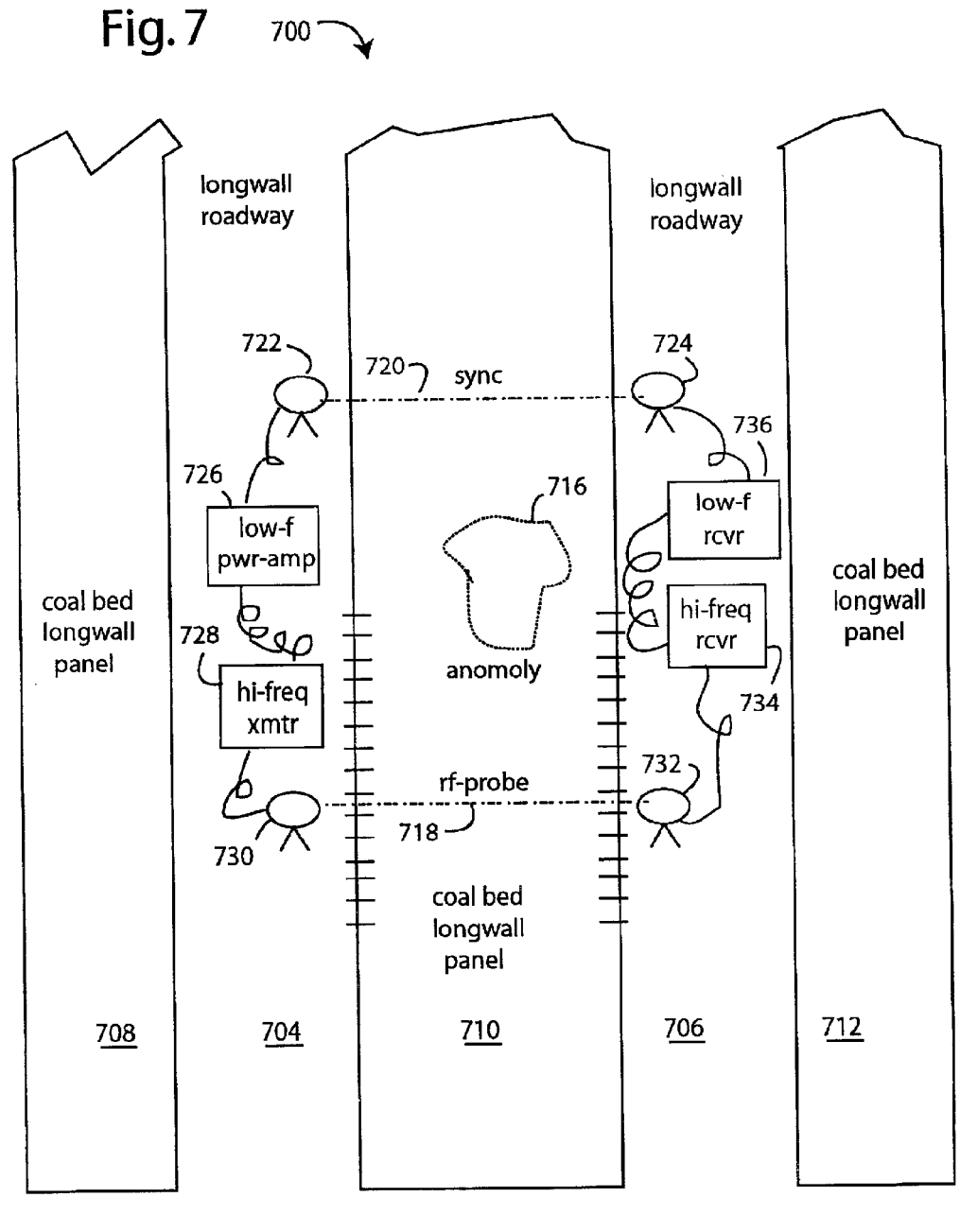

SHUTTLE-IN RECEIVER FOR RADIO-IMAGING UNDERGROUND GEOLOGIC STRUCTURES

RELATED APPLICATIONS

This application is related to and claims priority of U.S. Provisional Patent Application, Ser. No. 60/315,149, filed Aug. 27, 2001, and titled RADAR-NAVIGATION TOOL FOR MINING COAL, and claims benefit of 60/335,520, filed Oct. 31, 2001. Such is incorporated herein by reference.

FIELD OF THE INVENTION

The present invention relates to ground-penetrating radars and coal mining, and more particularly to borehole receivers for radio-imaging anomalous geology in coal bed deposits that can be hydraulically or pneumatically shuttled-in and pulled back out by a fiberoptic tether cord.

DESCRIPTION OF THE PRIOR ART

Underground coal deposits very often lie in flat horizontal layers with more-or-less regular thicknesses. However, the coal deposits are often times altered by fault dykes and sills, paleochannel altered coal, or rapidly thinning coal in various places. Sandstone replaces the washed out parts of the coal seam. The depositional environment concentrates heavy metals and sulfur in thin boundary layers of roof and floor coal, so it's best not to mine such low-grade coal if that can be avoided.

If the layer above is sandstone, it will probably be an aquifer and saturated with water. If dry, it will contain methane gas. Water will be injected into the coal seam. The interface above can undulate due to differential compaction and role when sediments scour into the coal. The low spots in these scoured undulations can be a surprise, and represent a hazard that can cause great expense mined into during coal extraction. These anomalies interfere with the extraction of methane from the coal deposit.

The identification of anomalies, such as the sediment-replaced washouts, is important so planning operations keep productivity high and cut cleaner coal. For example, the identification of an ancient river washout or paleochannel anomaly before mining began would allow longwall panels to be laid out to avoid crossing it. Methane produced by drilling into the paleochannel will encounter great volumes of water than increases cost.

The present inventor, Larry G. Stolarzyck, has described methods and equipment for imaging coal formations in geologic structures in many United States Patents. Some of those Patents are listed in Table I, and are incorporated herein by reference.

TABLE I

| Patent No. | Issued | Title |
|---|---|---|
| US04577153 | 03/18/1986 | Continuous Wave Medium Frequency Signal Transmission Survey Procedure For Imaging Structure In Coal Seams |
| US04691166 | 09/01/1987 | Electromagnetic Instruments For Imaging Structure In Geologic Formations |
| US04742305 | 05/03/1988 | Method For Constructing Vertical Images Of Anomalies In Geological Formations |
| US04753484 | 06/28/1988 | Method For Remote Control Of A Coal Shearer |
| US04777652 | 10/11/1988 | Radio Communication Systems For Underground Mines |
| US04879755 | 11/07/1989 | Medium Frequency Mine Communication System |
| US04968978 | 11/06/1990 | Long Range Multiple Point Wireless Control And Monitoring System |
| US04994747 | 02/19/1991 | Method And Apparatus For Detecting Underground Electrically Conductive Objects |
| US05066917 | 11/19/1991 | Long Feature Vertical Or Horizontal Electrical Conductor Detection Methodology Using Phase Coherent Electromagnetic Instrumentation |
| US05072172 | 12/10/1991 | Method And Apparatus For Measuring The Thickness Of A Layer Of Geologic Material Using A Microstrip Antenna |
| US05087099 | 02/11/1992 | Long Range Multiple Point Wireless Control And Monitoring System |
| US05093929 | 03/03/1992 | Medium Frequency Mine Communication System |
| US05121971 | 06/16/1992 | Method Of Measuring Uncut Coal Rib Thickness In A Mine |
| US05146611 | 09/08/1992 | Mine Communication Cable And Method For Use |
| US05181934 | 01/26/1993 | Method For Automatically Adjusting The Cutting Drum Position Of A Resource Cutting Machine |
| US05188426 | 02/23/1993 | Method For Controlling The Thickness Of A Layer Of Material In A Seam |
| US05260660 | 11/09/1993 | Method For Calibrating A Downhole Receiver Used In Electromagnetic Instrumentation For Detecting An Underground Conductor |
| US05268683 | 12/07/1993 | Method Of Transmitting Data From A Drillhead |
| US05301082 | 04/05/1994 | Current Limiter Circuit |
| US05408182 | 04/18/1995 | Facility And Method For The Detection And Monitoring Of Plumes Below A Waste Containment Site With Radiowave Tomography Scattering Methods |
| US05474261 | 12/12/1995 | Ice Detection Apparatus For Transportation Safety |
| US05686841 | 11/11/1997 | Apparatus And Method For The Detection And Measurement Of Liquid Water And Ice Layers On The Surfaces Of Solid Materials |
| US05769503 | 06/23/1998 | Method And Apparatus For A Rotating Cutting Drum Or Arm Mounted With Paired Opposite Circular Polarity Antennas And Resonant Microstrip Patch Transceiver For Measuring Coal, Trona And Potash Layers Forward, Side And Around A Continuous Mining Machine |
| USRE032563 | 12/15/1987 | Continuous Wave Medium Frequency Signal Transmission Survey Procedure For Imaging Structure In Coal Seams |
| USRE033458 | 11/27/1990 | Method For Constructing Vertical Images Of Anomalies In Geological Formations |

In underground coal mining practice, horizontal magnetic dipole antennas can be driven by a radio transmitter so a seam wave will propagate within the coal, or other layer of higher-resistivity media. A remote, horizontal magnetic dipole receiving antenna is then used to measure the seam wave with a receiver synchronized to the transmitter. Fiberoptic cables are preferably used for the receiver-transmitter synchronization, e.g., because metallic cables would interfere with reception by receiving the transmitted signals, and re-radiating them to compete with the direct signal to the receiver. Phase coherent receiver design allows synchronous detection and accurate phase measurements of the direct signal. The effects on direct signal phase help elicit the nature of the coal layer, given a priori or concomitant material dielectric-constant measurements. The magnitude and total phase shift measurements can be processed in a two-dimensional or three-dimensional tomography algorithm to form two-dimensional and three-dimensional images of the geologic structure.

However, the logistics of providing the synchronization cable can prove impossible in some mines and in some applications. So it would be desirable to synchronize such transmitters and receivers without requiring a cable between the receiver and transmitter. It is also difficult to maneuver the radio receiver without a mechanical shuttle means.

SUMMARY OF THE INVENTION

It is therefore an object of the present invention to provide an instrument for the detection and high-resolution two-dimensional and three-dimensional imaging of anomalous geologic structures.

It is another object of the present invention to provide a ground-penetrating radar receiver that can be easily placed at many locations in a borehole.

Briefly, a coal bed anomaly detection and imaging embodiment of the present invention comprises a synchronous transmitter and receiver that are separated by a geologic structure with embedded and hidden anomalies. The receiver is housed in a shuttle body that can be maneuvered in a borehole by computer controlled water or air pressure. Signal measurements are reported out over a fiberoptic pigtail. The receiver shuttle is tethered by such fiberoptic pigtail, and it can be manually withdrawn from the borehole by tugging back on the tether.

An advantage of the present invention is a ground-penetrating radar receiver is provided that can be moved in a borehole.

Another advantage of the present invention is a method is provided for the measurement of the total attenuation and phase shift of an imaging electromagnetic wave after its having propagated through a geologic target. These data are required for three-dimensional tomographic images.

These and other objects and advantages of the present invention will no doubt become obvious to those of ordinary skill in the art after having read the following detailed description of the preferred embodiments which are illustrated in the various drawing figures.

IN THE DRAWINGS

FIG. 7 is a plan view diagram of an underground, longwall coal mining operation that is being imaged across a longwall panel for anomalies by a radio probe system embodiment of the present invention.

DETAILED DESCRIPTION OF THE PREFERRED EMBODIMENT

Figure 1:
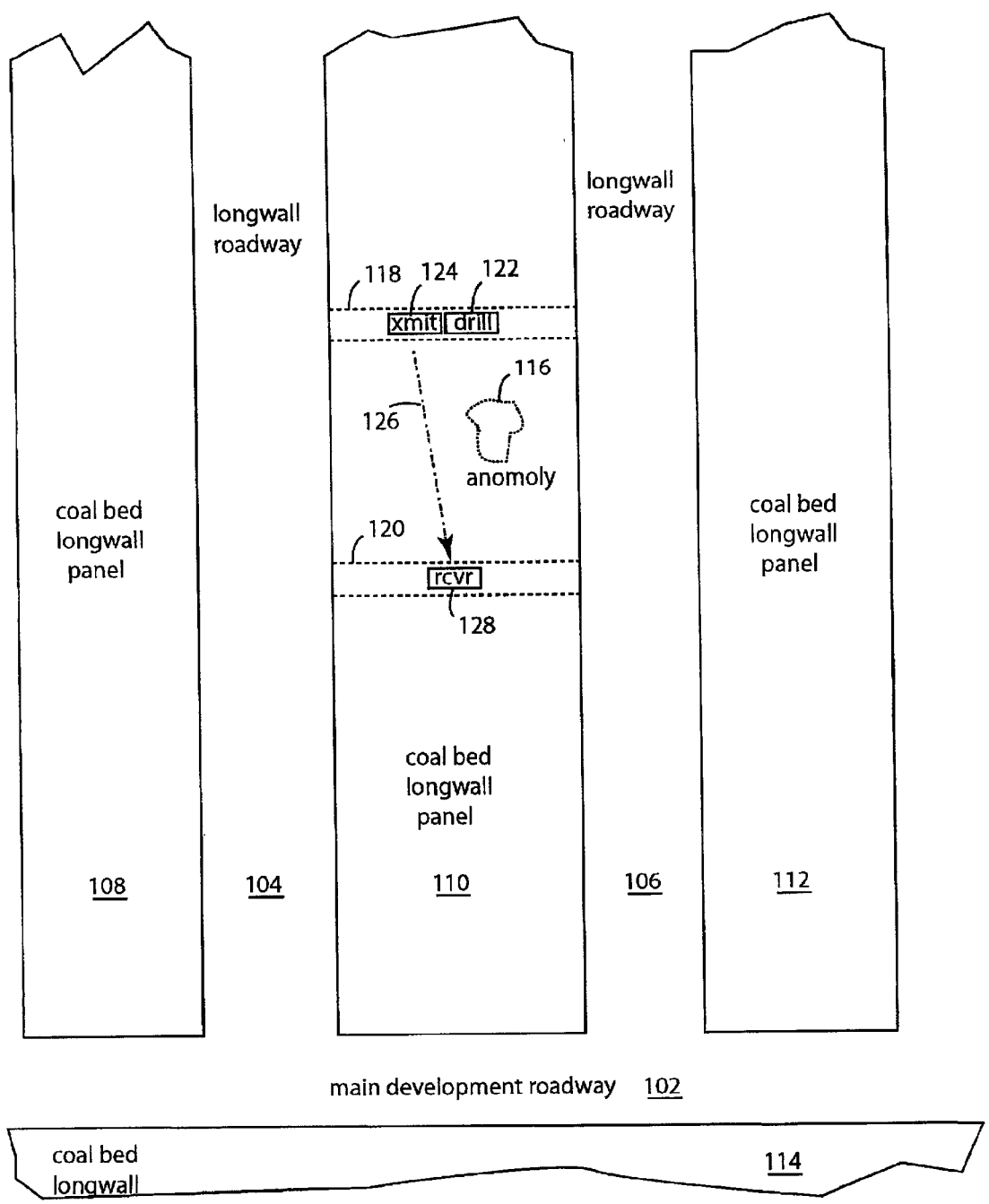
FIG. 1 is a plan view diagram of an underground, longwall coal mining operation that is being imaged between boreholes in the longwall panel for anomalies by a drillstring radio probe system embodiment of the present invention. The block coal may be a segment of a green field coal bed being imaged between boreholes.

FIG. 1 represents an underground block of coal or a longwall coal mining operation 100. In a longwall operation, a main development roadway 102 has several branching longwall roadways, e.g., roadways 104 and 106. These roadways are cut between a number of coal bed longwall panels 108, 110, 112, and 114. The coal bed longwall panels 108, 110, 112, and 114, can, and usually do include anomalies, e.g., anomaly 116.

Embodiments of the present invention permit the longwall panels to be imaged with electromagnetic waves for anomalies by passing through a combined high frequency probe radio wave and a low-frequency synchronizing radio wave. In FIG. 1, these signals are passed between de-gasification boreholes 118 and 120. Alternatively, the low frequency synchronization signal can be communicated by a fiberoptic cable laid between the transmitter and receiver.

Methane is conventionally degassed from the longwall panels by boring a series of horizontal bores spaced only a few hundred feet apart. For example, boreholes 118 and 120 were drilled and simultaneously degassed. A drillhead 122 is shown in the process of drilling borehole 118 and is fitted on its aft end with a transmitter 124. A drillstring is not shown. A dual-frequency signal 126 is emitted by transmitter 124 and is detected by a synchronous receiver 128. The dual-frequency signal 126 includes a high-frequency probe component that is substantially affected in signal strength and phase by anomaly 116. The dual-frequency signal 126 further includes a low-frequency synchronizing component that is not substantially affected by anomaly 116. The low-frequency synchronizing component is recovered in the receiver 128 to synthesize a synchronous local oscillator, and such enables synchronous detection of the high-frequency probe component. The synchronizing signal may also be sent by fiberoptic cable between the transmitter and receiver.

The typical, modern longwall coal mining operation 100 uses the so-called pillar method where large pillars of coal are left to support the roof and thereby prevent surface subsidence. The parts of the roof between the pillars are typically reinforced with six-foot long roof bolts. The roadways and panels between them can stretch several thousand feet in length. The panels are typically eight hundred seventy feet by twelve hundred feet sections. Conveyor belts and shuttle cars are used to move the coal from the cut faces to the main conveyer belt system.

The coal bed longwall panels 108, 110, 112, and 114, can, and usually do include anomalies, that are best left uncut. Such anomalies can comprise faults, water, porous sandstone, limestone, and other materials lacking coal and/ or presenting potential mining hazards. For example, mining or drilling into an underground paleochannel or fault can flood the mine and require expensive pumping and long delays in getting the water cleared out.

In the past, using conventional methods and equipment, these anomalies were not discovered until actually encountered. Knowing where these anomalies lie early in the mine development, can allow better planning of the overall mining operation, and allow the optimum room-and-pillar geometries and placements. Some traditional methods exist for developing a rough idea of the size, nature, and orientation of anomalies, but the electronic systems and methods described herein allow much better pictures and assessments.

Embodiments of the present invention permit the longwall panels to be electronically imaged by passing radio waves through them. In particular, the ways these radio waves are affected can be interpreted as showing anomalies in the otherwise homogeneous coal deposits. The anomalies will impart a different phase shift and attenuation on the radio waves than will coal. But such measurements require synchronous-detection by the receiver.

The longwall panel 110 imparts a phase shift and attenuation to the radio signal 126 that will be observed by receiver 128. Synchronous-detection is required to acquire data for two-dimensional and three-dimensional high-resolution full-wave tomography inversion.

In order to collect tomographic data so an image of the anomaly 116 can be reconstructed, the transmitter 124 and receiver 128 are moved up and down boreholes 118 and 120. This allows signal 126 to cut through the longwall panel 110 at may different perspectives, and the phase and attenuation experienced with each transmitter and receiver location is logged into a database. The images of the hidden anomalies can be tomographically processed from the database in real-time or in post processing.

The construction of the transmitter 124 and the receiver 128, as well as the methods used to reconstruct tomographic images of underground anomalies and of coal deposits are suggested and described in many of the present inventor's previously issued patents. For example, the reader is referred to U.S. Pat. No. 4,691,166, issued Sep. 1, 1987; U.S. Pat. No. 4,577,153, issued Mar. 18, 1986; Re-Exam 32,563, issued Dec. 15, 1987; U.S. Pat. No. 4,742,305, issued May 3, 1988; U.S. Pat. No. 5,408,182, issued Apr. 18, 1995, and Re-Exam 33,458, issued Nov. 27, 1990. All such Patents are incorporated herein by reference. None of these patents describe three-dimensional data processing.

Figure 2:
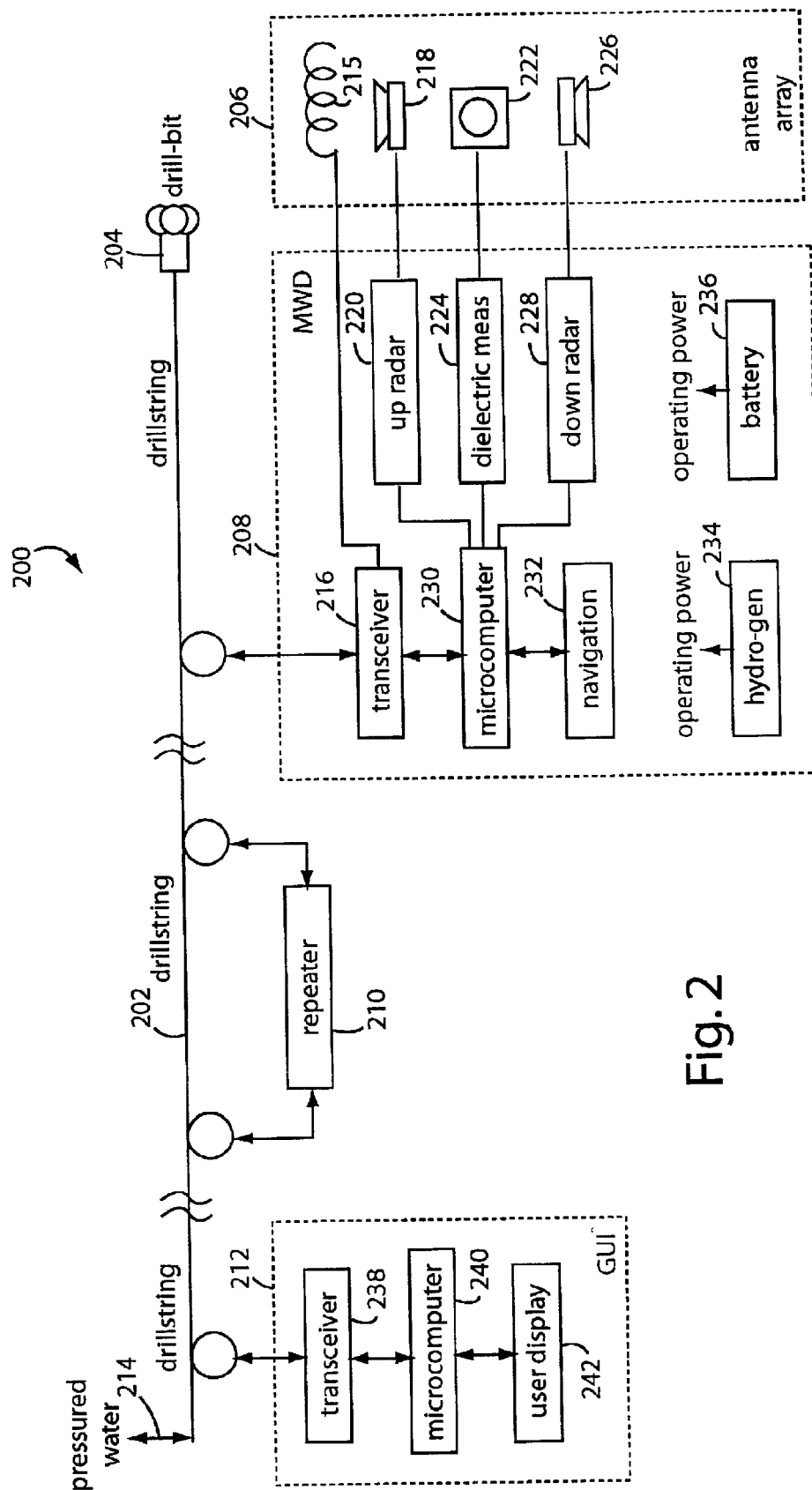
FIG. 2 is a functional block diagram of a drillstring and transmitter that could be used in the situation shown in FIG. 1.

FIG. 2 shows a drillstring mining system embodiment of the present invention, and is referred to herein by the general reference numeral 200. The drillstring mining system 200 comprises a long drillstring of water-filled pipes 202 that are used in directional drilling, e.g., horizontal drilling through coalbed deposits. A drill head 204 can be controlled to go left-right, up-down as it advances underground while boring. An antenna array 206 and a measure-while-drilling (MWD) unit 208 are attached to the drill head 204. They communicate over a radio channel back to the user above ground via the metal pipe in the drillstring 202. If the drillstring 202 is very long, a radio repeater 210 is needed to help boost the radio communication signals. A graphic user interface 212 is provided for the user. Pressurized water 214 is pumped into the drillstring 202 to circulate and remove drilling material from the drill head 204.

The antenna array 206 includes a loop antenna 215 connected to a radio transceiver 216 in MWD 208. An up-looking radar antenna 218 is connected to an up-radar unit 220 and is used to gauge the coalbed thickness above the drill head 204. A microwave patch antenna 222 is connected to a dielectric measurement unit 224 that assesses the dielectric constant of the material surrounding the drill head 204. A down-looking radar antenna 226 is connected to a down-radar unit 228 and is used to gauge the coalbed thickness below the drill head 204. A microcomputer 230 calculates the coalbed thickness and dielectric constant from the measurements provided. A navigation device 232 receives commands from the user and causes the drill head 204 to advance left-right and up-down.

The electronics of MWD 208 derives its operating power either from a miniature hydro-electric generator 234 or a battery 236, or both. The hydro-electric generator 234 is driven by the water flow in the drillstring 202 that results from the pressurized water 214. The battery 236 is used to maintain operation when the hydro-electric generator 234 is not being driven by a water flow.

The GUI 212 includes a transceiver 238 to communicate with the repeater 210 and the transceiver 216 over the drillstring 202. A microcomputer 230 converts data received from the MWD 208 into useful user information on a display 242. The user is presented with data that allows various navigation decisions to be made, as well as an assessment of the coalbed reserves and formation geometries.

Images of geologic structure are constructed by dividing the geologic region into pixels or boxels included in a plane or volume between locations visited by the receiver and transmitter. Lines between the locations visited represent the edges of the image plane. The width and height (and depth for three-dimensional) of each pixel or boxel is arbitrary, but is usually made unequal to the physical space between each transmitter and receiver location. One method of determining the electromagnetic wave propagation constants in each pixel is the well-known Algebraic Reconstruction Technique (ART) described in U.S. Pat. No. 5,260,660, issued Nov. 9, 1993. The two-dimensional and three-dimensional full wave inversion codes (FWIC) have been developed by Greg Newman of Sandia National Laboratories.

The ART method assumes an electromagnetic wave propagation will follow a straight line path between the transmitter and receiver locations. Such assumption is reasonably valid in a uniform geologic setting with anomalies. Anomalous geology can be mapped with distortion in the image aligned along the majority of ray paths. As the degree of geologic disturbance increases, the electromagnetic wave phenomena of refraction, reflection, and scattering increases and invalidates the ray path assumption in ART. Images reconstructed with the invalid assumption exhibit artifacts, e.g., false images, in the image plane. The FWIC code solves the distortion problem but requires greater processing capability.

Clearly, it would be desirable to have a synchronized electromagnetic wave instrumentation that would not be logistically constrained by requiring deployment of a synchronizing cable. Further, it would be desirable to have an image reconstruction algorithm that would not require a straight ray path assumption and that could account for electromagnetic wave propagation phenomena of refraction, reflection, and scattering in the geologic target.

The need for a synchronization cable is eliminated by simultaneously transmitting a low-frequency electromagnetic wave and the imaging-frequency signal. Because attenuation increases with frequency, the lower frequency, synchronization signal will propagate further and be relatively insensitive to anomalous geology. The carrier frequency of the synchronization signal is preferably in the range of 500–5,000 Hertz. The electrical conductivity ($\sigma$), dielectric constant ($\epsilon$), and magnetic permeability ($\mu$) all have an impact on the attenuation rate ($\alpha$) and phase constant ($\beta$). These so-called quasi-static conditions and the synchronization signal constant can be readily determined.

The synchronization receiver produces an output sync signal, which establishes the image signal receiver condition of phase coherency with the transmit signal. The phase of the received signal relative to the transmit signal can be measured. The instrumentation can measure the total phase shift in the electromagnetic wave when propagating from the transmitter to receiver location. Concurrently, the total attenuation of the imaging signal can be measured. The magnitude and total phase shift of the electromagnetic wave can be measured.

The total field measurement enables the use of the full-wave inversion code (FWIC), a newly developed image forming algorithm. The FWIC is defined as $E_T = E_I + E_S = E_i + \int \sigma E_i G(r_r, r') dr$, where $E_0$ is the total electric field measured by the receiver, $E_i$ is the incident electric field calculated at a point in the longwall panel, $\sigma$ is the electrical conductivity distribution within the longwall panel, $G(r,r')$ is the Green's function which accounts for wave propagation of the electromagnetic wave phenomena generated by an anomalous geologic structure.

The FWIC requires a forward modeling algorithm to determine the magnitude and phase of the incident wave everywhere within the geologic target. According to Maxwell's well-known equations, the incident electric field produces both conduction and displacement current flow in the target. Conduction current predominates when $\sigma/\omega\epsilon > 1$, and displacement current predominates when $\sigma/\omega\epsilon \ll 1$. By measuring the total field at each location, an iterative procedure is used to solve for the conductivity variation in the geologic target. The FWIC code does not require the straight ray path assumption and enables imaging reconstruction where anomalous geology causes wave propagation phenomena of refraction, reflection, and scattering to occur within the geologic target. See also, U.S. Pat. No. 5,408,182, issued Apr. 18, 1995.

The anomalous geology images will not rise to photographic-quality pictures. For example, anomalous geologic objects can appear in silhouettes in the image plane. Unknown geologic target images require interpretation by an expert, and involve art and science.

Figure 3:
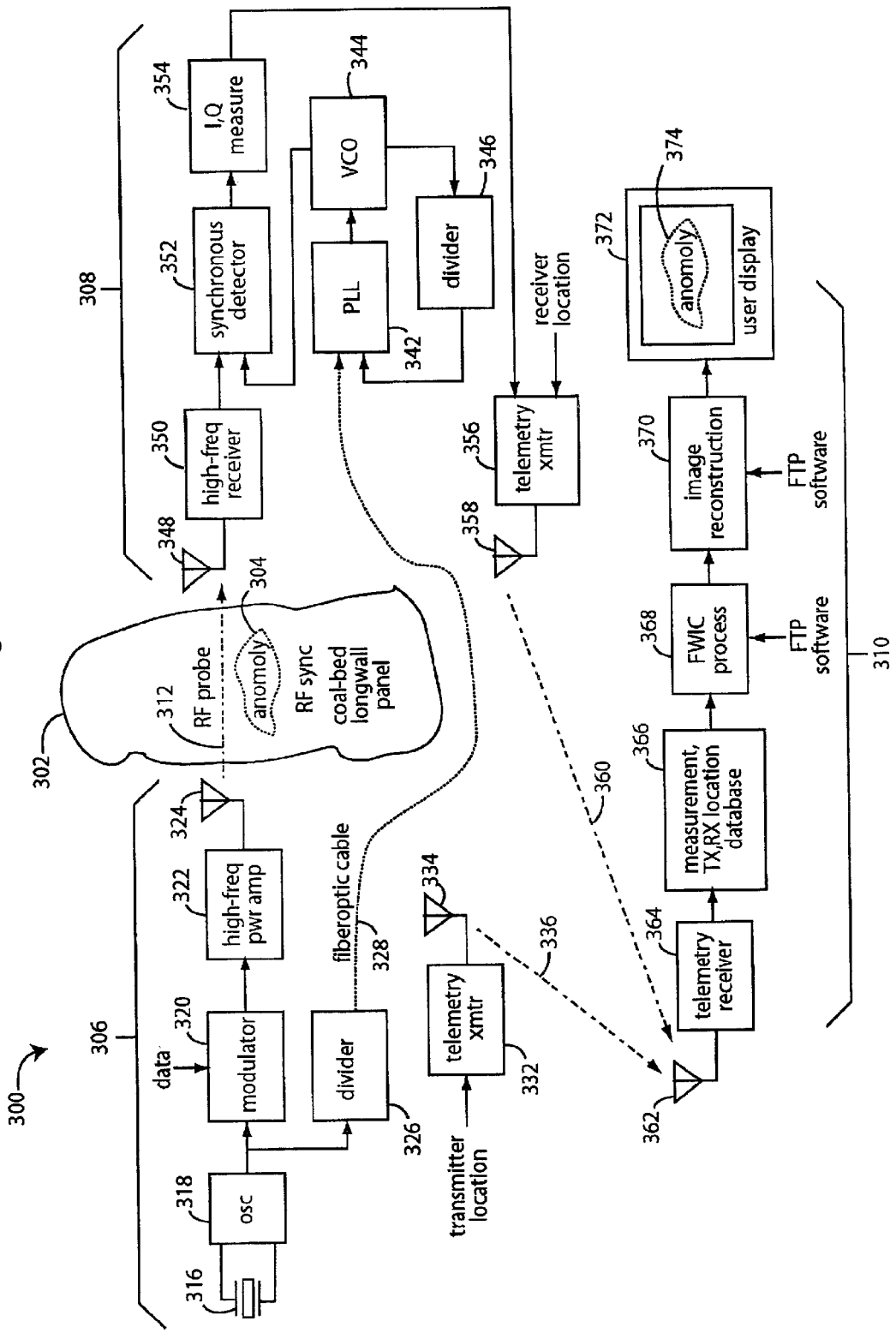
FIG. 3 is a functional block diagram of an anomaly-imaging system that could be implemented in part like the drillstring and transmitter of FIG. 2, and that could be used in the coal mining application shown in FIG. 1.

FIG. 3 is an anomaly imaging system embodiment of the present invention, and is referred to herein by the general reference numeral 300. The system 300 can be used effectively in the situations shown in FIGS. 1 and 2. The system 300 is used to image a coal-bed block of coal or longwall panel 302 for an anomaly 304. A probe transmitter 306 is positioned on one side, and a probe receiver 308 is positioned on the other side. An anomaly image processing sub-system 310 receives information about the real physical locations of probe transmitter 306 and probe receiver 308. It further receives measurements of the signal strength and phase shifts experienced by an RF-probe signal 312. An RF-synchronizing signal 314 is used to convey transmitter synchronization information for synchronous detection by the receiver 308. Such RF-synchronizing signal 314 has a much lower carrier frequency than the RF-probe signal 312, e.g., 500–5000 H. Because the signal frequency is in the range of 500–5000 H, the attenuation and total phase shift is small. The total phase shift in the synchronization electromagnetic wave can thus be analytically determined. The RF-probe signal 312 typically operates in the range of 0.1–1.5 MHz.

A crystal 316 provides a reference frequency to an oscillator 318. A modulator 320 accepts data that can be impressed on the RF-probe signal 312. A high-frequency radio power amplifier 322 builds up the signal for emission by a high-frequency transmitter antenna 324, e.g., a ferrite-core magnetic dipole type. A divider 326 provides a synchronous low frequency to a fiberoptic cable 328.

The real physical position of the transmitter antenna 324 is sent by a telemetry transmitter 332 out through an antenna 334 on a signal 336. Such transmitter information could alternatively be included in the data being input at modulator 320, and the telemetry transmitter 332 would not be necessary. The real physical position of the transmitter antenna 324 is needed in later tomographic processing to reconstruct an image of anomaly 304.

The fiberoptic cable 328 provides a sync signal for comparison in phase and locking by a phase locked loop (PLL) 342. This drives a voltage controlled oscillator (VCO) 344 to output the higher frequency being input to divider 326 and transmitter as RF-probe signal 312. A divider 346 helps accomplish this by divider 326.

The RF-probe signal 312 is received for measurement by a high-frequency antenna 348 and receiver 350. A synchronous detector 352 detects the carrier signal to reveal any attenuation and phase shift affects caused by the anomaly 304. An in-phase (I) and quadrature-phase (Q) measurement is taken by a sampler 354 and forwarded to a telemetry transmitter 356. The real physical position of receiving antenna 348 is also transmitted by a telemetry antenna 358 as a receiver telemetry signal 360. In alternative embodiments, the position information of transmitter antenna 324 may be included if it was sent by modulator 320. The transmitter 356 may not be needed in some applications.

The receiver 308 can be pushed along in a recently completed de-gas hole with ten-foot length fiber rod sections. Alternating a shuttle can be used to mimic the receiver. A companion transmitter may be built into a measure-while-drilling (MWD) instrument and tomography scans are conducted during normal drilling, e.g., so as to not slow down coal bed methane (CBM) drilling. The receiver in the prior drillhole is maneuvered with the push rods or the shuttle to acquire the tomographic data. It is possible to line the hole with plastic pipe and use water pressure to maneuver the receiver during a tomographic scan. It is possible to use the shuttle to maneuver the receiver.

On standing longwall panels, it is cost effective to first do a cross entry survey. The direct ray scan would acquire data at 50-ft intervals along the panel. The tomography scan would acquire diagonal path data from each 50-ft measuring station. This would locate geologic disturbance zones where CBM crosshole radio imaging is applied. Also, the radar is directed into these zones. In other words, radio imaging crosshole would only be used in geologic disturbance zones.

A telemetry antenna 362 and receiver 364 receive information about the locations of RF-probe antennas 324 and 348, as well as the I,Q measurement information from sampler 354. The locations of RF-probe antennas 324 and 348 indicate the ray path of RF-probe signal 312. The I,Q measurement information indicates whether that ray path was affected and to what degree by the anomaly 304. All this information is stored in a database 366 for real-time or post processing. A two-dimensional or three-dimensional full-wave inversion code (FWIC) process is used together with an image reconstruction process 370 to build a display image for a user display 372. A silhouette 374 in a graphic image is used to represent the real anomaly 304.

Figure 4:
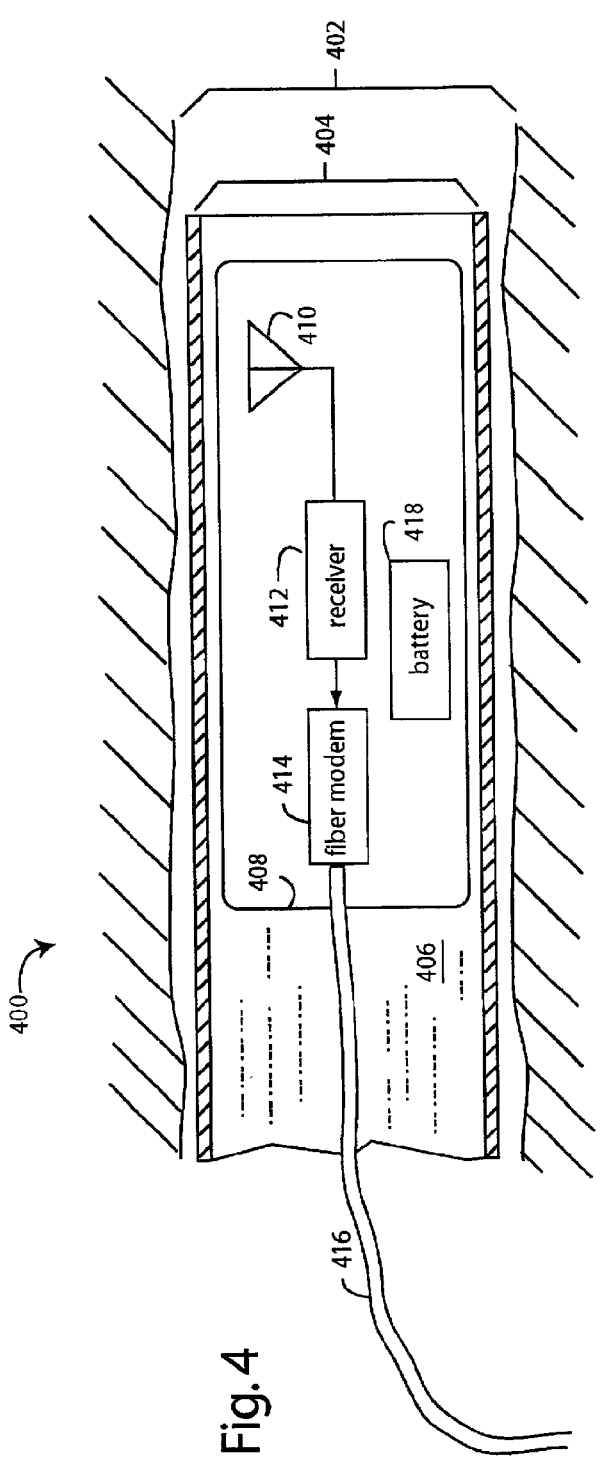
FIG. 4 is a mechanical schematic of a shuttle receiver useful in the coal mining application of FIG. 1.

FIG. 4 illustrates a pump-in, pull-back, receiver embodiment of the present invention which is useful in the coal mining application of FIG. 1, and is referred to herein by the general reference numeral 400. In contrast, FIGS. 6A–6D illustrate a shuttle-in, pull-back, receiver embodiment of the present invention which is self-propelled by a worm-like inching motion.

The receiver 400 is disposed in a borehole 402 in a coal deposit. A polyvinyl chloride (PVC) plastic pipe 404 may be used to sleeve the borehole. A fluid 406, such as pressurized water or air, is used to motivate a shuttle housing 408 deeper into the PVC pipe and borehole. A shuttle may employ hydraulic or air pressure to cause movement. An antenna 410 receives ground-penetrating radar signals that come through the coal deposit. A receiver 412 is used to measure the signal strength and phase of these signals. The measurements are digitally encoded by a fiberoptic modem 414 and sent down a tether 416. Alternatively, a synchronous signal may be sent by fiberoptic cable to the receiver. Such tether is preferably a tough, single-mode fiberoptic cable, that has been bundled with a fiberglass cord for strength and a tough plastic sheathing. The tether 416 is used to pull the shuttle housing and its included electronics back out of the PVC pipe and borehole. It would be useful to mark the tether 416 with feet and inches, or meters, so that the physical position of the receiving antenna 410 could be easily known for tomographic processing of the signal measurements taken.

Figure 5:
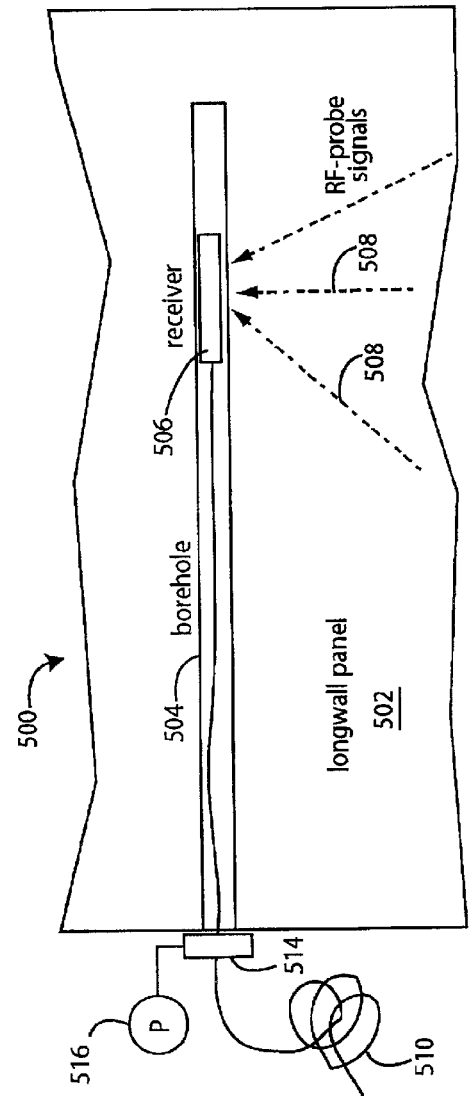
FIG. 5 is a diagram of the shuttle of FIG. 4 showing how the receiver can be moved and further showing a coil of fiberoptic cable and hydraulic or pneumatic cable can be used to mark its depth in the borehole.

FIG. 5 represents a shuttle-in, pull-out, receiver system 500. A coal-bed longwall panel 502 is drilled with a borehole 504 to evacuate methane gas. A receiver 506 is deployed and is similar to receiver 128 (FIG. 1), receiver 308 (FIG. 3), and receiver 400 (FIG. 4). A number of RF-probe signals 508 are received through a section of the longwall panel 502. A coil of fiberoptic cable 510 is connected to a database storage unit 512. Any measurements of the signals 508 and the physical position of receiver 506 in borehole 504 are collected in the database 512 for tomographic processing. The borehole 504 can be pressurized to move the receiver 506 in by a pressure cap 514 at the open end of the borehole. A pump 516 supplies either water or air pressure. The coil of fiberoptic cable 510 tethered to the receiver is used to mark the depth of the receiver in the borehole, and also to pull it out.

For the most part, image interpreting geoscientists and other users have prerequisite skills and training in electromagnetic wave theory. However, refraction, reflection, and scattering increase the uncertainties in the image because the assumption of a straight ray path becomes erroneous. Software tools can be downloaded (FTP) to the geoscientist's personal computer, e.g., over the Internet. Using simple layered models of hypothetical geology, the geoscientist can introduce the suspect geologic anomaly into the generic model and determine its electromagnetic wave response using mathematical forward modeling code. The hypothetical model can be uploaded to a data processing center where a forward modeling algorithm resides in an operating program. The forward model output would be the total electromagnetic wave fields measurable at each receiver location.

These modeled data would also be processed, e.g., in the FWIC 368, to form a hypothetical image. Also, the hypothetical image can be downloaded to the geoscientist to improve scientific objectivity in the data interpretation.

A natural coal seam waveguide occurs in layered sedimentary geology because the electrical conductivity of the bounding shale, mudstone, and fire clay, ranges between 0.01 and 0.1 Siemens per meter (S/m) (100 and 10 ohm-meters). Inside, the conductivity of the coal is near 0.0005 S/m (2,000 ohm-meters). The 10:1 conductivity contrast enables the waveguide travel of electromagnetic waves within the coal bed.

The electric field ($E_Z$) component of a traveling electromagnetic wave (EM) is polarized in a vertical direction and the magnetic field ($H_y$) component is polarized horizontally in the seam. The energy in this part of the EM wave travels laterally in the coal seam from the transmitter to the radio imaging receiver. There is a horizontally polarized electric field ($E_X$) that has zero value in the center of the seam and reaches maximum value at the sedimentary rock-coal interface. This component is responsible for transmission of the electromagnetic wave signal into the boundary rock layer. The energy in this part of the EM wave travels vertically in the coal deposit.

The magnitude of coal seam radiowave decreases as it travels along the waveguide. The attenuation rate and cylindrical spreading of wave energy in the coal seam are two of the things at work that attenuate the traveling signals. The cylindrical spreading factor is $$\frac{1}{\sqrt{r}},$$

where r is the distance from the transmitting to receiving antenna. This factor compares with the non-waveguide far-field spherically spreading factor of $$\frac{1}{r}.$$

Thus, for a given separation of one-hundred meters, the magnitude of the seam EM wave decreases by ten in a waveguide, and by a factor of one-hundred in an unbounded media. So one advantage of sending signals down a seam waveguide is the much greater travel distance. Another advantage is that the traveling electromagnetic wave predominantly stays within the coal seam, the main item of interest.

A coal-seam electromagnetic wave is very sensitive to changes in the waveguide geometry and materials. The radiowave attenuation rate (decibels per 100 feet) and phase shift (electrical degrees per 100 feet) were determined by Dr. David Hill at the National Institute for Science and Technology (NIST). Dr. James Wait was the first to recognize that natural waveguides exist in the earth's crust. Both are Fellows in the Institute of Electrical and Electronic Engineers. The science underlying the traveling of an electromagnetic wave in the coal seam waveguide is well known. The crosshole and in-mine transmitters and receivers are now highly developed. Such transmitters and receivers are synchronized to enable the measurement of total path phase shift that the media imposes between the transmitter and the receiver locations. The total phase shift measurement contributes greatly to the resulting three-dimensional image presented to a user. Prior art radio imaging instrumentation measures only the change in magnitude of radiowave, e.g., attenuation, when propagating in the coal seam waveguide.

In uniform-construction waveguides, the path is a straight line. The path length or distance a radio signal travels can be determined from attenuation measurements. The straight line path is an assumption used in the Algebraic Reconstruction Technique (ART) tomography algorithm. But radiowaves are refracted near significant geologic anomalies causing the travel path of the radiowave to bend and be longer than in the uniform waveguide case. This bending cannot be accounted for in ART processing and accounts for this distortion in the ART tomography processing algorithm. By measuring the total path phase shift, the bending effect can be accounted for in a new type of tomography reconstruction algorithm called Full-wave Inversion Code (FWIC). two-dimensional and three-dimensional radio imaging IV instrumentation acquires data that can be processed in the Sandia National Laboratories' WAIC algorithm. The effect of attenuation in the waveguide is to reduce the magnitude of the electromagnetic wave along the path.

Under sandstone sedimentary rock, the attenuation rate increases because more of the radio imaging signal travels vertically into the boundary rock, i.e., leaks from the waveguide. If water is injected into the coal, then clay in the coal causes the electrical conductivity to decrease and the attenuation rate/phase shift to increase.

The attenuation rate/phase shift rapidly increases with decreasing seam height. Thus coal seam thinning can be easily detected with radio imaging. Higher attenuation rate zones suggest that either the coal seam boundary rock is changing, the seam is rapidly thinning, or/and water has been injected into the coal seam. Drilling and radar would determine the exact cause of the anomalous seam condition. This advance in the state of the art in mining would reduce both risk and cost in coal extraction.

Faults and dykes cause reflections to occur in the waveguide. The reflections can appear as excess path loss. Total phase shift measurements are useful in detecting reflection anomalies.

The predominating electromagnetic wave propagation mode in layers of coal is a "seam wave". Such is polarized in the plane of the seam, and has a uniform, polarized electric field orthogonal to the layer. In horizontal lying coal bed layers, the magnetic field will be horizontally polarized with the same field strength across a vertical cross-section. The electric field is vertically polarized. A third electric field is polarized in the horizontal plane and is maximum value at each boundary of the seam.

The horizontal component of the electric field is null near the physical center of the coal seam, albeit if the lower-resistivity boundary layers above and below are about equal in their respective material electrical resistivities.

FIGS. 6A–6D illustrates a self-propelled, shuttle-in, pullback, receiver embodiment of the present invention which is referred to herein by the general reference numeral 600. The receiver 600 is disposed inside a borehole 601 during use. A radio imaging mechanism (RIM) 602 is packaged in a main body 604 with a piston-sequencing controller 606. Such main body 604 is propelled inside the borehole 601 by a near piston 608, a near-end expanding foot 608, an intermediate piston 612, a distal piston 614, and a distal-end expanding foot 616.

Figures 6A, 6B, 6C, 6D:
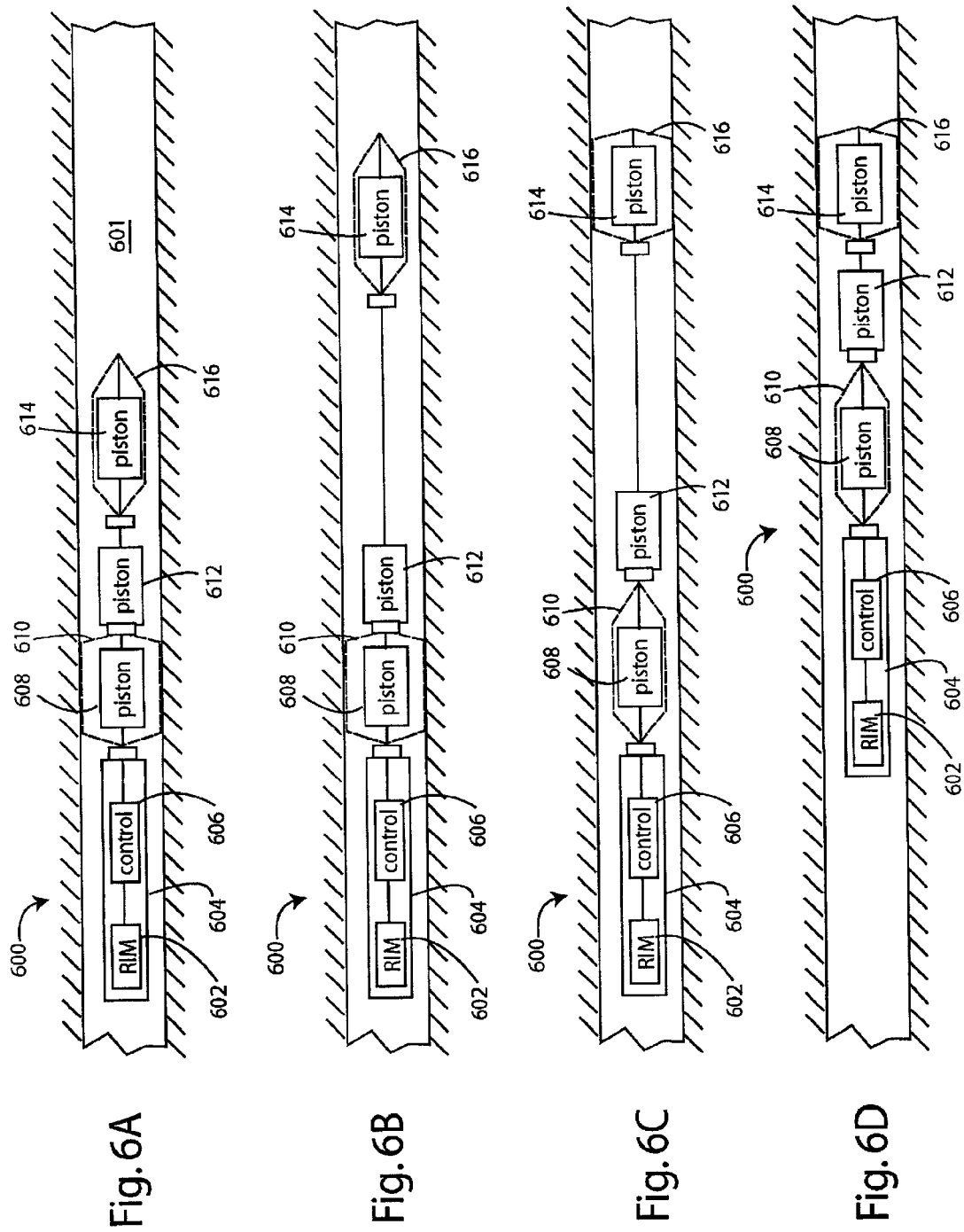
FIGS. 6A–6D represents a self-propelled receiver in a sequence of steps in which a hydraulic piston crawler embodiment of the present invention inches its way along inside a borehole.

In operation, FIG. 6A shows a starting condition. The near-end expanding foot 610 grips the inside walls of borehole 601 by retracting near piston 608. Distal piston 614 is extended, so the distal-end foot collapses away from the inside of the borehole 601. In FIG. 6B, intermediate piston 612 is extended by controller 606 to position the distal piston 614 and distal-end expanding foot 616 further down borehole 601. In FIG. 6C, the distal piston 614 is extended to cause the distal-end expanding foot 616 to grip the new position inside borehole 601. The near piston 608 is extended to contract near-end expanding foot 608. This releases that grip inside borehole 601. The receiver 600 is now free to inch forward inside borehole 601. In FIG. 6D, the intermediate piston 612 is retracted to bring the main body 604 along. The sequence of FIGS. 6A–6D repeats as much as is necessary to position the receiver at the desired location in borehole 601. The sequence can be reversed to back the receiver 600 out of the borehole 601, or a tether can be attached to simply pull it out. Such tether would also include a communications cable with which to collect and process measurements.

FIG. 7 is a plan view diagram of an underground, longwall coal mining operation that is being imaged across a longwall panel for anomalies by a radio probe system embodiment of the present invention. The instrumentation of FIG. 3 can be used in such application shown here. In a longwall coal mining operation, a main development roadway 702 has several branching longwall roadways, e.g., roadways 704 and 706. These roadways are cut between a number of coal bed longwall panels 708, 710, 712, and 714. Such coal bed longwall panels can, and usually do, include anomalies, e.g., an anomaly 716.

Embodiments of the present invention permit the longwall panels to be imaged with electromagnetic waves for anomalies by passing through a high frequency probe radio wave 718 and a low-frequency synchronizing radio wave 720. In FIG. 7, these signals are passed between branching longwall roadways, e.g., roadways 704 and 706. Alternatively, the low frequency synchronization signal can be communicated by a fiberoptic cable 328 (FIG. 3) laid between the transmitter and receiver.

For example, a sync transmitter antenna 722 generates sync signal 720 which is received by a sync receiving antenna 724. These stay fixed during each series of measurements. A low-frequency power amplifier 726 receives a synchronizing signal derived from a high frequency transmitter 728. A high frequency transmitter antennas 730 is positioned at a number of places during such series of measurements to pass RF probe signal 718 through different portions of longwall panel 710. Similarly, a high frequency receiver antenna 732 is placed in parallel positions along roadway 706 during the series of measurements. A high-frequency receiver 734 uses a sync signal detected by a low frequency receiver 736 in synchronous detection of the RF probe signals attenuation and phase shifts. These are used to image anomaly 716 using full-wave inversion code (FWIC), for example.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. An underground coal-bed radio imaging system, comprising:
   a radio transmitter for underground placement in a first location at one side of a coal deposit;
   a radio receiver for underground placement in a second location at another side of said coal deposit, and providing for measurements of radio signals from the transmitter that pass between said first and second locations; and a shuttle body in which the radio receiver is disposed and providing for changes in said second location;

a plastic pipe for insertion into a borehole in said coal deposit and providing for a sliding pathway for the shuttle body to move between a plurality of said second locations; and a hydraulic-pressure means attached to one end of the plastic pipe and for providing a motivating means to push the shuttle body to a distal end.

2. The system of claim 1, further comprising:

a tether attached to the shuttle body and providing for maneuvering of the receiver within a borehole.

3. The system of claim 1, further comprising:

a fiberoptic modem disposed in the receiver and providing for data communication of said measurements of radio signals out to a tomographic processor.

4. The system of claim 1, further comprising:

a pneumatic-pressure means attached to one end of the plastic pipe and for providing a motivating means to push the shuttle body to a distal end.

5. The system of claim 1, further comprising:

an inching mechanism associated with the shuttle body for self-propelled motion within a borehole.

6. The system of claim 1, further comprising:

a tether attached to the shuttle body and providing a means for pulling the receiver into a new second location and for withdrawing it entirely.

7. The system of claim 2, further comprising:

a fiberoptic cable disposed in the tether and providing for data communication of said measurements of radio signals out to a tomographic processor.

8. The system of claim 6, further comprising:

a fiberoptic cable disposed in the tether and providing for local clock synchronization to enable synchronous detection of the transmitter's signals in the receiver.

9. An underground coal-bed radio imaging system, comprising:

a radio transmitter for underground placement in a first location at one side of a coal deposit;

a radio receiver for underground placement in a second location at another side of said coal deposit, and providing for measurements of radio signals from the transmitter that pass between said first and second locations;

a shuttle body in which the radio receiver is disposed and providing for changes in said second location;

an inching mechanism associated with the shuttle body for self-propelled motion within a borehole;

a tether attached to the shuttle body and providing a means for pulling the receiver into a new second location and for withdrawing it entirely;

a fiberoptic cable disposed in the tether and providing for data communication of said measurements of radio signals out to a tomographic processor;

a fiberoptic modem disposed in the receiver and providing for digital encoding of said measurements of radio signals, and connected to the fiberoptic cable;

a plastic pipe for insertion into a borehole in said coal deposit and providing for a sliding pathway for the shuttle body to move between a plurality of said second locations; and a pressurization means attached to one end of the plastic pipe and for providing a motivating means to push the shuttle body to a distal end.

10. An underground coal-bed radio imaging system, comprising:

a shuttle body for housing a battery, an antenna and electronics, and providing for linear movement;

a plastic pipe for insertion into a borehole in an underground coal deposit, and providing for a sliding pathway for the shuttle body to move between a plurality of receiver locations between a near end and a distal end;

a radio receiver disposed in the shuttle body, and providing for measurements of radio signals from a remote underground transmitter;

a tether attached to the shuttle body and providing a means for pulling the receiver toward said near end;

an inching mechanism associated with the shuttle body for self-propelled motion within a borehole;

a fiberoptic cable disposed in the tether and providing for data communication of said measurements of radio signals out to a tomographic processor;

a fiberoptic modem disposed in the receiver and providing for digital encoding of said measurements of radio signals, and connected to the fiberoptic cable; and a pressurization means attached to said near end of the plastic pipe and for providing a motivating means to push the shuttle body to said distal end.

11. The underground coal-bed radio imaging system of claim 10, further comprising:

a computer for processing said measurements in full-wave inversion code to produce user displays of geologic anomalies.

* * * * *